US012758865B2

(12) United States Patent
Yu et al.

(10) Patent No.: US 12,758,865 B2
(45) Date of Patent: Oct. 13, 2026

(54) SYSTEM AND METHOD FOR PROVIDING GAME UTILIZING REAL-WORLD ENVIRONMENTAL INFORMATION, AND RECORDING MEDIUM STORING PROGRAM EXECUTING THE METHOD

(71) Applicant: FUNNY STORM, Seongnam-si (KR)

(72) Inventors: Chunggil Yu, Suwon-si (KR); Jeong-Hwan Im, Hanam-si (KR)

(73) Assignee: FUNNY STORM, Seongnam-si (KR)

( * ) Notice: Subject to any disclaimer, the term of this patent is extended or adjusted under 35 U.S.C. 154(b) by 130 days.

(21) Appl. No.: 18/665,243

(22) Filed: May 15, 2024

(65) Prior Publication Data

US 2024/0382831 A1 Nov. 21, 2024

(30) Foreign Application Priority Data

May 18, 2023 (KR) ........................ 10-2023-0064603
Mar. 4, 2024 (KR) ........................ 10-2024-0030893

(51) Int. Cl.
*A63F 13/00* (2014.01)
*A63F 13/216* (2014.01)

(52) U.S. Cl.
CPC .................................. *A63F 13/216* (2014.09)

(58) Field of Classification Search
None
See application file for complete search history.

(56) References Cited

U.S. PATENT DOCUMENTS 8,488,011 B2 * 7/2013 Blanchflower ......... G06T 11/60 348/211.3
8,668,592 B2 * 3/2014 Watkins, Jr. ............ A63F 13/47 463/43
9,064,326 B1 * 6/2015 Loxam ................... G06V 20/20
10,796,489 B1 * 10/2020 Cordes .................. A63F 13/213
2012/0231887 A1 * 9/2012 Lee ......................... A63F 13/79 463/39
2014/0225924 A1 * 8/2014 Loxam ..................... G09G 5/14 345/633

(Continued)

FOREIGN PATENT DOCUMENTS

JP 6404489 B2 10/2018
KR 10-2005-0116335 A 12/2005

(Continued)

*Primary Examiner* — Paul A D'Agostino
(74) *Attorney, Agent, or Firm* — ALSTON & BIRD LLP

(57) ABSTRACT

Disclosed are a system and a method of providing a game by utilizing real-world environmental information, and a recording medium storing a program executing the method, which provide an accessed client terminal with a client program and cause an interaction available game environment configuration linked to current real-world environmental information to be executed through the client program. According to the present disclosure, various real-world environment elements obtained through GPS information, environment-related APIs, and the like may be applied to the game environment configuration to enable a user to play a game while interacting with the game environment configuration, thereby improving connection with the real-world environment, and providing users with various game experiences according to changes in the real-world environment.

11 Claims, 8 Drawing Sheets

(56) References Cited

U.S. PATENT DOCUMENTS

| | | | | |
|---|---|---|---|---|
| 2014/0253743 | A1* | 9/2014 | Loxam | G06T 11/60 348/207.1 |
| 2016/0018886 | A1* | 1/2016 | Song | G06F 3/04815 715/757 |
| 2016/0086381 | A1* | 3/2016 | Jung | G06V 20/20 345/633 |
| 2016/0093106 | A1* | 3/2016 | Black | G06T 11/60 345/633 |
| 2018/0311573 | A1* | 11/2018 | Pickover | G16H 15/00 |
| 2018/0315248 | A1* | 11/2018 | Bastov | G06T 19/006 |
| 2018/0345147 | A1 | 12/2018 | Okajima et al. | |
| 2019/0022530 | A1* | 1/2019 | Kornmann | A63F 13/65 |
| 2019/0076731 | A1* | 3/2019 | Hickman | G06F 16/51 |
| 2019/0275429 | A1* | 9/2019 | Yang | A63F 13/50 |
| 2019/0371279 | A1* | 12/2019 | Mak | G09G 5/373 |
| 2021/0151010 | A1* | 5/2021 | Lundmark | G06F 3/147 |

FOREIGN PATENT DOCUMENTS

| | | | |
|---|---|---|---|
| KR | 10-2007-0021952 | A | 2/2007 |
| KR | 10-2009-0075420 | A | 7/2009 |
| KR | 10-1951436 | B | 5/2019 |
| KR | 10-2212261 | B | 2/2021 |
| KR | 10-2022-0017515 | A | 2/2022 |
| KR | 10-2022-0052676 | A | 4/2022 |
| KR | 10-2023-0008874 | A | 1/2023 |

* cited by examiner

FIG. 4

| Real space | Virtual space |
|---|---|
| Department store | Fancy goods store |
| Cemetery | Undead village |
| High temperature | Flora and fauna in high temperature area<br>High-temperature preferring monsters / dragons |
| Low temperature | Flora and fauna in low temperature area<br>Low-temperature preferring monsters / dragons |
| Rain, Snow | Rain, rain + rain and snow on object |
| Australia | Australian-related flora and fauna<br>+ monsters / dragons living in Australia |
| Sea, Edge of water | Flora and fauna living in sea or water,<br>water-loving monsters / dragons in virtual space |
| Nighttime | Night- , darkness-loving flora and fauna,<br>darkness preferring monsters / dragons |
| Daytime | Daytime- , light-loving flora and fauna,<br>daytime preferring monsters / dragons |

SYSTEM AND METHOD FOR PROVIDING GAME UTILIZING REAL-WORLD ENVIRONMENTAL INFORMATION, AND RECORDING MEDIUM STORING PROGRAM EXECUTING THE METHOD

CROSS-REFERENCE TO RELATED APPLICATION

This application claims priority to and the benefit of Korean Patent Application No. 10-2023-0064603 filed in the Korean Intellectual Property Office on May 18, 2023, and Korean Patent Application No. 10-2024-0030893 filed in the Korean Intellectual Property Office on Mar. 4, 2024, the entire contents of which are incorporated herein by reference.

BACKGROUND OF THE INVENTION

(a) Field of the Invention

The present disclosure relates to a system and a method of providing a game by utilizing real-world environmental information, and a recording medium storing a program executing the method, which receive real-world environmental information via an API server or the like, provide an interaction available game environment configuration that is linked based on the real-world environmental information, and provide various game experiences according to the real-world environment.

(b) Description of the Related Art

With the development of mobile technology, the time and space constraints of building games are decreasing and game players are becoming more interactive. As game consumers have diversified, there have been various attempts to merge the gaming space with the real world.

Existing games like Pokémon Go have applied familiar Pokémon characters to augmented reality games, reigniting a boom in consumption of the original Pokémon characters.

However, there were limitations when real-world information is reflected in the game space.

Specifically, attempts have been made to closely reflect the physical spatial form of the real world in the game environment, but elements other than spatial design have not been reflected, such that it fails to provide connection to the real world environment and a variety of game environment configurations that may interact with the user in a game play process as the environment changes.

SUMMARY OF THE INVENTION

The present disclosure attempts to provide a technology capable of providing various game experience that is linked to real-world environmental information and interactive with a player according to environment changes by utilizing real-world environmental information.

An exemplary embodiment of the present disclosure provides a system for providing a game by utilizing real-world environmental information, the system including: a service server for receiving and registering membership information of game service users from client terminals and executing membership management; and a game server for providing the client terminal with a client program for executing a game, in which the game server causes an interaction available game environment configuration linked to current real-world environmental information to be executed through the client program.

In this case, the game server may cause one or more of a type, function, performance, and the number of in-game objects to be changed according to real-world environmental information, as the interaction available game environment configuration.

Further, the object may include one or more of dragons, monsters, plants, animals, non-player characters (NPCs), and game items.

Further, the game server may cause a type or the number of in-game quests to be changed based on real-world environmental information.

Further, the game server may cause the interaction available game environment linked to the current real-world environmental information to be configured on the client terminal based on a matching table including an interaction available game environment configuration that matches each of the real-world environmental information.

In this case, the game server may provide the matching table to the client terminal to cause the client terminal to autonomously configure the interaction available game environment based on current real-world environmental information.

Further, the game server may include: a client program providing unit for providing the client program; an environmental information providing unit for receiving current real-world environmental information by communicating with an external API server and providing one preset environmental information to the client terminal; and a game providing unit for providing player information for executing a user game.

In the meantime, the one environmental information may include environmental information for a specific region or preferred environmental information.

Another exemplary embodiment of the present disclosure provides a method of providing a game by a system by utilizing real-world environmental information, the method including: providing an accessed client terminal with a client program; and causing an interaction available game environment configuration linked to current real-world environmental information to be executed through the client program.

In this case, the causing of the interaction available game environment configuration linked to current real-world environmental information to be executed may include causing one or more of a type, function, performance, and the number of in-game objects to be changed according to real-world environmental information.

Further, the object may include one or more of dragons, monsters, plants, animals, non-player characters (NPCs), and game items.

Further, the method may further include causing a type or the number of in-game quests to be changed based on real-world environmental information.

Further, the causing of the interaction available game environment configuration linked to the current real-world environmental information to be executed may include, based on a matching table including an interaction available game environment configuration that matches each of the real-world environmental information, causing the interaction available game environment linked to the current real-world environmental information to be configured on the client terminal.

In this case, the causing of the interaction available game environment configuration linked to the current real-world environmental information to be executed may include:

providing the matching table to the client terminal; and causing the client terminal to autonomously configure the interaction available game environment based on the matching table according to current real-world environmental information.

Further, the method may further include receiving current real-world environmental information by communicating with an external API server and providing the client terminal with one preset environmental information.

Further, the one environmental information may include environmental information for a specific region or preferred environmental information.

Still another embodiment of the present disclosure provides a recording medium storing a program executing a game providing method utilizing real-world environmental information, in which the game providing method includes: storing, by a client terminal, a matching table including an interaction available game environment configuration that matches each of real-world environmental information; receiving, by the client terminal, real-world environmental information; and executing, by the client terminal, the interaction available game environment configuration based on the matching table according to received current real-world environmental information.

In this case, the executing of the interaction available game environment configuration may include changing one or more of a type, function, performance, and the number of in-game objects according to the real-world environmental information.

Further, the object may include one or more of dragons, monsters, plants, animals, non-player characters (NPCs), and game items.

Further, the game providing method may further include providing a notification for environmental information of a specific region or preferred environmental information according to a user's setting.

As described above, according to the present disclosure, various real-world environment elements obtained through GPS information, environment-related APIs, and the like may be applied to the game environment configuration to enable a user to play a game while interacting with the game environment configuration, thereby improving connection with the real-world environment.

Further, according to the present disclosure, it is possible to provide a user with a variety of game experiences according to real-world environmental changes.

BRIEF DESCRIPTION OF THE DRAWINGS

FIG. 4 is a table for configuring an interaction available game environment that is matched to real-world environmental information and is provided according to one aspect of the present disclosure.

DETAILED DESCRIPTION OF THE EMBODIMENTS

Figure 1:
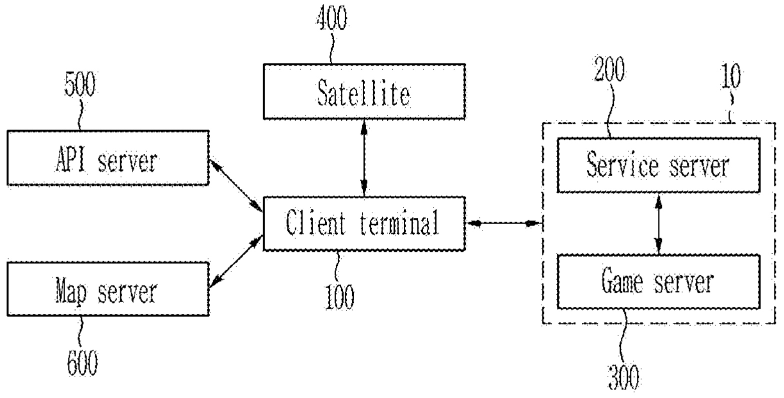
FIG. 1 is an overall block diagram illustrating a system according to one aspect of the present disclosure.

Hereinafter, exemplary embodiments of the present disclosure will be described with reference to accompanying drawings so as to be easily understood by a person ordinary skilled in the art. However, the present disclosure may be variously implemented and is not limited to the following embodiments. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

In addition, the terms "... er", "... or", "a ... module" described in the specification mean units for processing at least one function and operation and may be implemented by hardware components or software components and combinations thereof.

The devices described in the present disclosure are formed of hardware including at least one processor, a memory device, a communication device, and the like, and a program executable in combination with the hardware is stored at a designated location. The hardware has the configuration and performance to execute the method of the present disclosure. The program includes instructions implementing the method of the operation of the present disclosure described with reference to the drawings, and is combined with hardware, such as a processor and memory device, to execute the present disclosure.

In the present specification, "transmit or provide" may include not only direct transmission or provision, but also indirect transmission or provision through another device or by utilizing a bypass path.

In the present specification, expressions in the singular may be construed as either singular or plural, unless the explicit words "one" or "single" or the like are used.

In the present specification, regardless of the drawing, the same reference numeral refers to the same component, and "and/or" includes each and every combination of one or more of the recited components.

Terms including an ordinary number, such as first and second, are used for describing various constituent elements, but the constituent elements are not limited by the terms. The terms are used only to discriminate one constituent element from another constituent element. For example, without departing from the scope of the present disclosure, the first component may be named as the second component, and similarly, the second component may be named as the first component.

In the flowchart described with reference to the drawing, the order of operations may be changed, several operations may be merged, some operations may be divided, and specific operations may not be performed.

The present disclosure is a technology that enables various elements of the current real-world environment to which a user belongs to be applied to a game environment configuration in which the user is currently playing.

According to the present disclosure, a variety of gaming experiences may be linked to current real-world environmental changes and be provided to users.

More specifically, first, as illustrated in FIG. 1, a user may enjoy a game via a client terminal 100.

The client terminal 100, for example, a mobile terminal, may access a game server 300, download a necessary client program, and play a target game. At this time, the client terminal 100 may also register for membership by registering information and receive membership services via the service server 200.

The client terminal 100 may receive GPS information via the satellite 400.

The client terminal 100 may then receive real-world environment data and map data based on a current location in the game space via an API server 500 and a map server 600. Through this, the client terminal 100 may apply information, such as current weather, temperature, humidity, and time, to the game environment configuration in real time.

In other words, according to the present disclosure, the client terminal 100 may call the map server 600 and the API server 500 by using GPS information.

Then, the client terminal 100 may configure a matching game environment according to the current real-world environmental information. The game space may be configured according to the current real-world environmental information data changes and interacted with the user during the game play process. Thus, the user may be provided with a realistic and diverse game environment.

Each of a variety of real-world environment factors that may be obtained through APIs, such as temperature, country, weather, altitude, time, wind, fog, UV light, precipitation, fine dust, stock price information, or traffic information are configured as the matching game environment, so that players may enjoy a game in a game environment that is linked to the real world.

For example, as the game environment configuration according to temperature, for environments above 30 degrees Celsius, tropical and desert plants, such as broadleaf trees and cacti, animals adapted to hot climates, such as camels and desert foxes, and monsters and dragons that appear only when temperatures are high may be provided as the game environment. Further, the game environment may be configured to make enemies that don't like heat weaker and enemies that like heat stronger.

Further, for the temperature of 0 degrees Celsius or lower, cold-hardy plants, such as conifers and leafless trees, animals adapted to cold climates, such as penguins and polar bears, and monsters and dragons that appear only when the temperature is low may be configured as the game environment. The game environment may also be configured to make enemies that like cold stronger and enemies that don't like cold weaker.

In addition, as the game environment configuration according to country, for Australia, plants and animals that are unique to Australia (for example, eucalyptus, acacia, and kangaroos) may be provided, and monsters, dragons, and in-game dungeons that appear only in Australia may be provided.

For Russia, plants and animals that are unique to Russia, such as birches, oaks, bears, and tigers, may be provided, and monsters, dragons, and dungeons that appear only in Russia may be provided.

In addition, as the game environment configuration according to the weather, rain may be realized in the game space when it rains, the intensity of the rain may be adjusted according to the amount of precipitation, and frogs, snails, and the like may be provided as environmental elements that appear when it rains. In addition, certain monsters or dragons may appear when it rains, and rain-loving enemies may become stronger and rain-hating enemies may become weaker.

When snow falls in the real-world environment, the game space may be snowy, the intensity of the snow may be adjusted according to the amount of snowfall, and polar bears, penguins, snow hares, and the like may appear as environmental elements when it snows. In addition, certain monsters or dragons may appear when it snows, and snow-loving enemies may become stronger and snow-hating enemies may become weaker.

In addition, as the game environment configuration according to altitude, for high altitude, the entities are mainly giant, and slowly glide through the high air, may breathe at high altitudes, and feed primarily on solar energy in the high atmosphere, and players may encounter dragons flying at high altitudes as enemies when the players fly on a dragon at high altitudes.

For lower altitudes, there may appear dragons that appear at lower altitudes, usually small entities with poor wings, heavy bodies, or breathing at lower altitudes. If a player character rides a dragon flying at low altitudes, the player character may encounter and battle dragons at low altitudes.

In addition, as the game environment configuration according to time, when the real-world environment is daytime, deer, butterflies, and the like may appear as animals that are active in the daytime, and flame fiends, eagles, and the like may appear as enemies appearing at daytime.

Enemies that dislike morning and evening hours may become weaker, and enemies that like daytime hours may become stronger.

When the real-world environment is in the evening, animals that are active in the evening may include bats, frogs, and the like, and enemies that appear during the evening hours may be dark fiends, shadow slimes, and the like. Enemies that hate daytime hours may become weaker and enemies that like evening hours may become stronger.

The game environment may also be configured to spawn more monsters or occupied territories when the stock price of the corresponding area increases or traffic increases.

The client terminal 100 may also configure the game environment by applying in-game background music and sound effects in conjunction with real-time environmental information based on the current location.

For example, the client terminal 100 may play background music for various weather conditions, such as rainy, sunny, or cloudy, to enhance the immersion of the game.

The user, that is the player, may experience encountering and interacting with in-game characters that change according to real-time environmental information based on the current location. For example, a dark-loving skeleton becomes stronger at night, but a light-hating skeleton becomes weaker at daytime. The user may more joyfully enjoy the game through the interaction while recognizing and learning how to use the game effectively.

In other words, according to the present disclosure, the type, function, performance, and number of in-game objects, such as monsters, dragons, game characters, items, plants, and animals, may be changed according to the current real-world environmental information.

According to the present disclosure, an interaction available game environment configuration including a game character may be interactively varied in response to real-time environmental data (temperature, weather, altitude, time, country, and the like) based on a current location, such that interaction with the game character may also be varied in response to the real-time environmental data.

The above elements are exemplary, and may cause the client terminal 100 to configure the game environment based on a matching table by utilizing various information obtainable from map servers, weather APIs, and the like to enable interaction with the game environment configuration.

That is, by utilizing the GPS function of the client terminal 100 that reflects the user's real-world location, the client terminal 100 may receive weather information, and the like of the corresponding location, and configure a virtual game environment that matches the real-world environmental information based on a matching table stored in the client terminal 100 through a downloaded client program.

Alternatively, the game server 300 may store the matching table and provide the client terminal 100 with interaction available game environment configuration data that matches the current real-world environmental information.

The service server 200 may manage user access, and may register membership information of game service users and perform membership management.

The game server 300 may provide a client program for playing a game upon request of the client terminal 100, and may provide player data for starting the game.

The game server 300 may receive real-world environmental information of the current location and provide the client terminal 100 with the received real-world environmental information, and may provide notifications about the real-world environmental information and matching game environment configuration elements to induce user access even when the client terminal 100 is not running a game.

As described above, the game server 300 may also provide the client terminal 100 with interaction available game environment configuration data that matches the current real-world environmental information.

The API server 500 may provide environmental information at the current location based on GPS values of the client terminal 100 determined from the satellite 400.

For example, the API server 500 may provide various environmental information based on a request from the client terminal 100, such as weather, temperature, wind speed, precipitation, fine dust, stock price information, or traffic information.

The map server 600 may provide requested map data based on the GPS value of the client terminal 100.

The map server 600 may provide map data in a tiled format representing geographic characteristics of an area.

Figure 2:
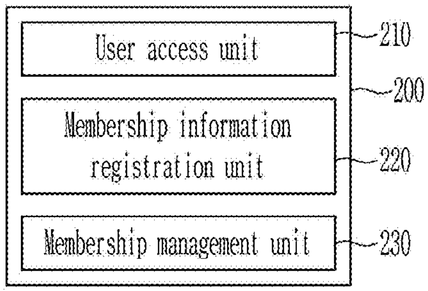
FIG. 2 is a block diagram illustrating a service server according to one aspect of the present disclosure.

FIG. 2 is a detailed configuration diagram illustrating the service server 200 according to one aspect of the present disclosure.

As illustrated, the service server 200 may include a user access unit 210, a membership information registration unit 220, and a membership management unit 230.

The user access unit 210 is an interface with the client terminal 100 and may receive requests and information from the client terminal 100.

The membership information registration unit 220 may collect and register information about users who register as members.

The membership management unit 230 may manage the history of registered members or set/manage events provided to members.

Figure 3:
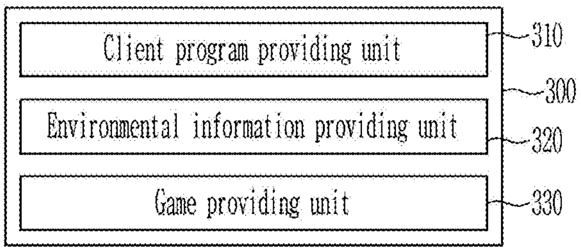
FIG. 3 is a block diagram illustrating a game server according to one aspect of the present disclosure.

Hereinafter, the game server 300 according to one aspect of the present disclosure will be described in more detail with reference to FIG. 3.

The game server 300 may include a client program providing unit 310, an environmental information providing unit 320, and a game providing unit 330.

The client program providing unit 310 may provide the client terminal 100 with programs required for game play.

The client program providing unit 310 may also provide a table defining an interaction available game environment configuration that is matched based on real-world environmental information in which the user is located, allowing the client terminal 100 to configure an interaction available game environment that is matched based on the received real-world environmental information.

The environmental information providing unit 320 may communicate with the API server 500 to receive the real-world environmental information. The environmental information providing unit 320 may provide specific environmental information to the client terminal 100 based on the settings.

For example, a user may set, via the client terminal 100, a notification for environmental information of a specific region, or may set a notification for preferred environmental information.

When it snows in specific area A set by the user, the environmental information providing unit 320 may provide a notification, such as "It is snowing in area A. Dragons appearing when it snows may appear."

Otherwise, for example, when the user has set 0 degrees Celsius or lower as a preferred environmental information, the environmental information providing unit 320 may provide a notification, such as "The temperature in your area is 0 degrees Celsius or lower. A polar bear may appear."

The environmental information providing unit 320 may also provide the client terminal 100 with the notification even when the user is not playing the game, to induce the user to access the game.

The game providing unit 330 provides player information to enable a user to play a game, and may provide game data for configuring an interaction available game environment based on the matching table described above.

FIG. 4 is an example of a table defining an interaction available game environment configuration that is matched according to real-world environmental information.

That is, as illustrated, for example, when the geographic information provided by map data of the area in which the player is currently located includes a department store, an apartment complex, or a cemetery, the game space may be formed of a fancy goods store, an orc village, or an undead village, respectively.

Also, when the temperature of the current location is high, the game environment may be configured with real-world flora and fauna that live in warmer climates, or monsters or dragons that are set to prefer higher temperatures in the game in the game space.

Also, when the temperature of the current location is low, the game environment may be configured with real-world flora and fauna that live in colder climates, or monsters or dragons that are set to prefer lower temperatures in the game in the game space.

Similarly, if it is raining or snowing in the real world, the rain or snow may be represented in the corresponding game space, and each object in the game may be represented as pooling rain or accumulating snow.

Further, for example, when the player's actual location is Australia, Australian-related flora and fauna and monsters or dragons that are set to live in Australia may appear in the game space.

Also, when the player's current location is sea or at the edge of the water, the virtual game space may include flora and fauna that live in the sea or water in the real world, and monsters or dragons that are set to be water-loving in the game.

Further, when the player's real-world environment is night or day, the matching game environment may be composed of night-loving and dark-loving flora and fauna, and monsters or dragons set to prefer darkness, or light-loving flora and fauna, and monsters or dragons set to prefer day.

Players may get rid of or capture dragons or monsters that appear, and depending on the type of dragon or monster, and the getting rid of or capturing the dragons or monsters may be accumulated with various values as experience values of the player.

Also, although not illustrated in the matching table above, the quests of Non Player Characters (NPCs) appearing in the game may be set differently based on real-world environmental information.

For example, on a snowy day, an NPC may provide the player with a quest to obtain cloth and make a fur coat, and the player may be provided with various rewards or abilities based on the completion of the quest.

Also, although not illustrated in the above matching table, various items may be provided as interaction available game environment configurations based on real-world environmental information.

For example, when opening an in-game treasure chest, a costume item, such as an umbrella or raincoat, may appear on a rainy day to prevent the player's body temperature from dropping, or a monster or Halloween costume may be provided on a day, such as Christmas or Halloween.

Each item may also be matched to have a different function or performance based on real-world environmental information.

For example, a hawk-eye item that increases a player's area of activity may be matched to decrease the effectiveness of the item by 20% on days with high levels of fine dust and increase the effectiveness of the item by 20% on days with low levels of fine dust.

In other words, according to the present disclosure, the type, function, performance, and number of objects as an interaction available game environment configuration may be changed according to the current real-world environmental information, and the type or number of in-game quests may be changed.

Thus, the player may enjoy a variety of game experiences that change according to the real-world environmental information.

Figure 5:
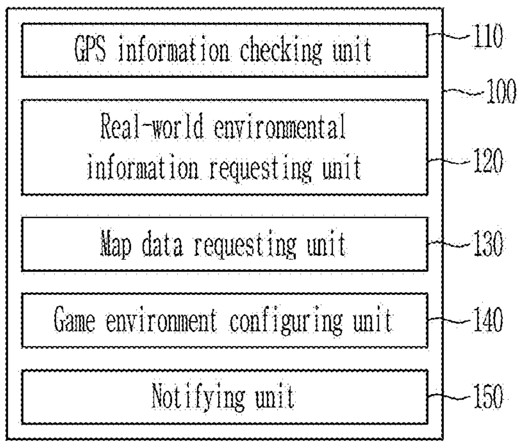
FIG. 5 is a detailed configuration diagram of a client terminal according to one aspect of the present disclosure.
Figure 6:
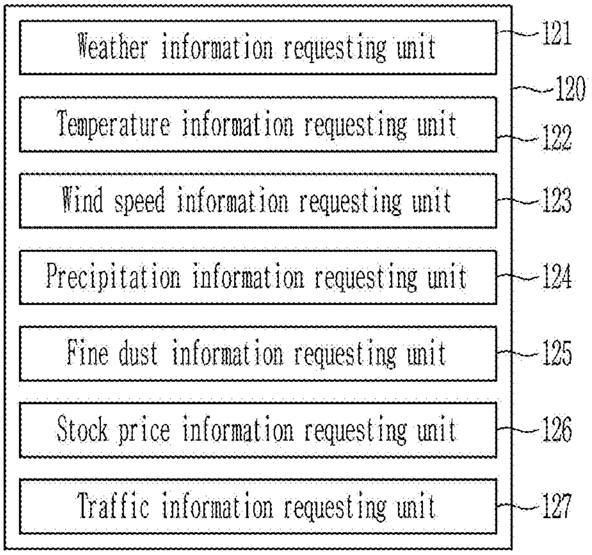
FIG. 6 is a detailed configuration diagram of a real-world environmental information request unit of FIG. 5.

FIG. 5 is a detailed configuration diagram of the client terminal 100 according to one aspect of the present disclosure.

As illustrated, the client terminal 100 may include a GPS information checking unit 110, a real-world environmental information requesting unit 120, a map data requesting unit 130, a game environment configuring unit 140, and a notifying unit 150.

The GPS information checking unit 110 may check the current location information of the client terminal 100 via satellite.

The real-world environmental information requesting unit 120 may receive real-world environmental information from the API server 500 based on GPS values and utilize the received real-world environmental information in configuring the game environment.

For example, the real-world environmental information requesting unit 120 may receive various real-world environmental information, such as weather, temperature, wind speed, precipitation, fine dust, stock price, or traffic, at the corresponding location from the API server 500.

The map data requesting unit 130 may request map data from the map server 600 based on the player's GPS location, and for example, may receive map data in the tiled format representing geographic features of the area.

The game environment configuring unit 140 may configure a game environment for the player that is linked to the real-world environmental information via an interaction available game environment configuration matching table pre-downloaded from the game server 300.

As described above, the game environment configuring unit 140 may match real-world environmental information and geographic information based on the table to generate a large-scale game environment with which the player interacts during the course of the game.

The notification unit 150 may provide environmental information for a specific region based on settings, or may provide preferred environmental information to the user.

For example, if a user sets a notification for area B and it is raining in the set area B, the notifying unit 150 may provide a notification, such as "It is raining in area B. Herbal plants that grow when it rains may appear".

Through the notification, the user may move to area B and, for example, obtain an herbal plant that is effective against physical damage.

Alternatively, for example, when the user has set night as his/her preferred environment, the notifying unit 150 may provide a notification, such as "Sunset time has passed in the current area. Monsters that like darkness may appear."

More specifically, the real-world environmental information requesting unit 120 may include a weather information requesting unit 121, a temperature information requesting unit 122, a wind speed information requesting unit 123, a precipitation information requesting unit 124, a fine dust information requesting unit 125, a stock price information requesting unit 126, and a traffic information requesting unit 127 to receive real-world environmental information, such as weather, temperature, wind speed, precipitation, fine dust, stock price, and traffic from the corresponding API server 500.

The configuration may also request and receive more real-world environmental information, as an embodiment of the present disclosure.

Hereinafter, the overall flow of configuring an interaction available game environment that is linked to current real-world environmental information on a game server and client terminal in accordance with one aspect of the present disclosure is summarized and described with reference to FIGS. 7 and 8.

Figure 7:
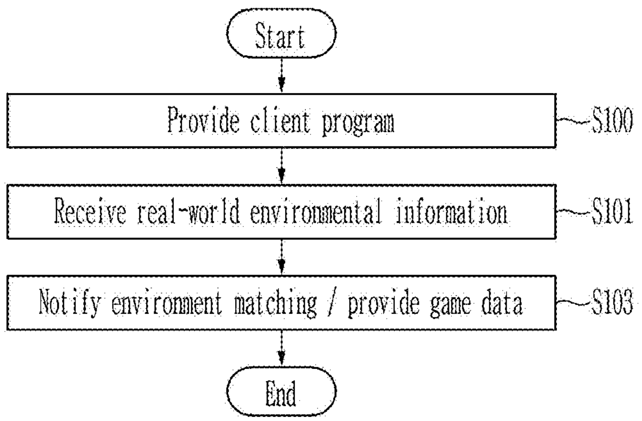
FIG. 7 is an overall flow diagram of provision of an interaction available game environment configuration that is lined to real-world environmental information by the system according to one aspect of the present disclosure.

First, as illustrated in FIG. 7, the game server 300 may provide the client terminal 100 accessed for game play with the client program, such that a matching table between the current real-world environmental information and the interaction available game environment is set, and the client terminal 100 communicates with external servers 300, 500, and 600 to execute game play (S100).

In this case, the game server 300 may communicate with the API server 500 to receive real-world environmental information (S101).

The game server 300 may set a notification for an environment of a specific region of the user or a notification for user's preferred environmental information.

Then, the game server 300 may provide the client terminal 100 with a notification about the real-world environmental information of the specific region according to the settings. Alternatively, the game server 300 may also provide a notification when the real-world environmental information of the current region matches the preset environmental information. The details are as described above and will be omitted hereinafter.

Meanwhile, the game server 300 provides the client terminal 100 with player information to allow the user to execute the game, and may also provide game data for configuring an interaction available game environment based on the matching table (S103).

Figure 8:
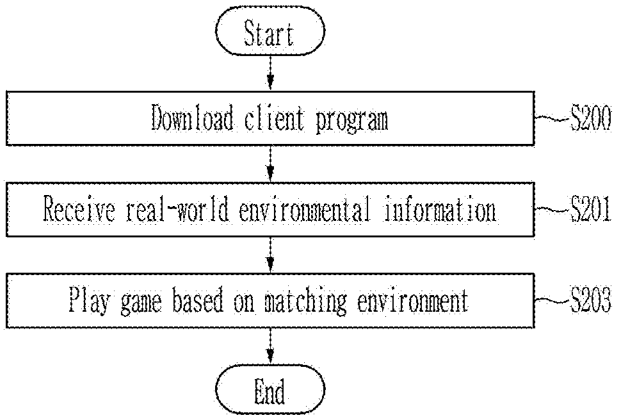
FIG. 8 is an overall flow diagram of provision of an interaction available game environment configuration that is linked to real-world environmental information by a client terminal according to one aspect of the present disclosure.

FIG. 8 is an overall flowchart of a method of executing, by the client terminal 100, an interaction available game environment configuration that is linked to the real-world environmental information.

The client terminal 100 may download a client program required to access the game from the game server 300, and in this case, the client terminal 100 may receive a matching table between the real-world environmental information and the interaction available game environment (S200).

Further, the client terminal 100 may receive the real-world environmental information from the API server 500 or the like (S201).

The client terminal 100 may execute an interaction available game environment configuration that matches the real-world environmental information based on the matching table stored in the terminal 100. Further, in some embodiments, the matching table may be stored in the game server 300, such that the game server 300 may provide game data for the interaction available game environment configuration.

Then, as described above, the client terminal 100 may provide environmental information of the specific region, or may provide preferred environmental information to the user according to user settings (S203).

The exemplary embodiments of the present disclosure described above are not only implemented through the apparatus and method, but may also be implemented through programs that realize functions corresponding to the configurations of the exemplary embodiment of the present disclosure, or through recording media on which the programs are recorded.

Although an exemplary embodiment of the present disclosure has been described in detail, the scope of the present disclosure is not limited by the exemplary embodiment. Various changes and modifications using the basic concept of the present disclosure defined in the accompanying claims by those skilled in the art shall be construed to belong to the scope of the present disclosure.

DESCRIPTION OF SYMBOLS

| | |
|---|---|
| 100: Client terminal | 110: GPS information checking unit |
| 120: Real-world environmental information requesting unit | |
| 121: Weather information requesting unit | |
| 122: Temperature information requesting unit | |
| 123: Wind speed information requesting unit | |
| 124: Precipitation information requesting unit | |
| 125: Fine dust information requesting unit | |
| 126: Stock price information requesting unit | |
| 127: Traffic information requesting unit | |
| 130: Map data requesting unit | |
| 140: Game environment configuration unit | |
| 150: Notifying unit | 200: Service server |
| 210: User access unit | |
| 220: Membership information registration unit | |
| 230: Membership management unit | |
| 300: Game server | |
| 310: Client program providing unit | |
| 320: Environmental information providing unit | |
| 330: Game providing unit | 400: Satellite |
| 500: API server | 600: Map server |

What is claimed is:

1. A system for providing a game, the system comprising:

a service server for receiving and registering membership information of game service users from client terminals and executing membership management; and a game server for providing the client terminal with a client program for executing a game in a virtual reality world matched to a real world, wherein the client program includes a matching table between (i) geographical information and environmental information of the real world at a location corresponding to a GPS value of the client terminal, and (ii) a virtual geographical space, objects, and quests constituting a virtual reality world of the game, wherein the client terminal receives geographical information and two or more types of real-world environmental information of a current location corresponding to the GPS value from a map server and an API server, and executes, based on the stored matching table, a virtual reality world configuration that is composed of a virtual geographical space matched to the geographical information of the current location and objects and quests matched to the two or more types of current real-world environmental information, and that interacts with a player, wherein interaction available game environment configuration elements that are matched according to real-world environmental information of the current location include a type, function, performance, and number of objects, and a type and number of quests, wherein the virtual geographical space, objects, and quests of the game are generated according to real-time geographical information and environmental information of the current location of the client terminal, and game play is executed, and wherein, according to real-time changes in environmental information, one or more of a type, function, performance, and number of objects in the virtual geographical space are changed, and a type or number of in-game quests are changed.

2. The system of claim 1, wherein:

the object includes one or more of dragons, monsters, plants, animals, non-player characters (NPCs), and game items.

3. The system of claim 1, wherein:

the game server includes:

a client program providing unit for providing the client program;

an environmental information providing unit for receiving current real-world environmental information by communicating with an external API server and providing the client terminal with one preset environmental information; and a game providing unit for providing player information for executing a user game.

4. The system of claim 3, wherein:

the one environmental information includes environmental information for a specific region or preferred environmental information.

5. A method of providing a game by a system, the method comprising:

providing an accessed client terminal with a client program; and causing a game in a virtual reality world matched to a real world to be executed through the client program, wherein the client program includes a matching table between (i) geographical information and environmental information of the real world at a location corresponding to a GPS value of the client terminal, and (ii) a virtual geographical space, objects, and quests constituting a virtual reality world of the game, wherein the causing of the game to be executed includes:

the client terminal receiving geographical information and two or more types of real-world environmental information of a current location corresponding to the GPS value from a map server and an API server, and executing, based on the stored matching table, a virtual reality world configuration that is composed of a virtual geographical space matched to the geographical information of the current location and objects and quests matched to the two or more types of current real-world environmental information, and that interacts with a player, wherein interaction available game environment configuration elements matched according to the real-world environmental information of the current location include a type, function, performance, and number of objects, and a type and number of quests, wherein the virtual geographical space, objects, and quests of the game are generated according to real-time geographical information and environmental information of the current location of the client terminal, and game play is executed, and wherein, according to real-time changes in environmental information, one or more of a type, function, performance, and number of objects in the virtual geographical space are changed, and a type or number of in-game quests are changed.

6. The method of claim 5, wherein:

the object includes one or more of dragons, monsters, plants, animals, non-player characters (NPCs), and game items.

7. The method of claim 5, further comprising:

receiving current real-world environmental information by communicating with an external API server and providing the client terminal with one preset environmental information.

8. The method of claim 7, wherein:

the one environmental information includes environmental information for a specific region or preferred environmental information.

9. A non-transitory computer-readable recording medium storing a program executing a game providing method, wherein the game providing method comprises:

storing, by a client terminal, a matching table between (i) geographical information and environmental information of the real world at a location corresponding to a GPS value of the client terminal, and (ii) a virtual geographical space, objects, and quests constituting a virtual reality world of the game;

receiving, by the client terminal, geographical information and two or more types of real-world environmental information of a current location corresponding to the GPS value from a map server and an API server; and executing, by the client terminal, based on the matching table, a virtual reality world configuration that is composed of a virtual geographical space matched to the geographical information of the current location and objects and quests matched to the two or more types of current real-world environmental information, and that interacts with a player, wherein the interaction available game environment configuration elements matched according to the real-world environmental information of the current location include a type, function, performance, and number of objects, and a type and number of quests, wherein the virtual geographical space, objects, and quests of the game are generated according to real-time geographical information and environmental information of the current location of the client terminal, and game play is executed, and wherein, according to real-time changes in environmental information, one or more of a type, function, performance, and number of objects in the virtual geographical space are changed, and a type or number of in-game quests are changed.

10. The non-transitory computer-readable recording medium of claim 9, wherein:

the object includes one or more of dragons, monsters, plants, animals, non-player characters (NPCs), and game items.

11. The non-transitory computer-readable recording medium of claim 10, wherein:

the game providing method further includes providing a notification for environmental information of a specific region or preferred environmental information according to a user's setting.

* * * * *